United States Patent [19]
Donald et al.

[11] 3,883,803
[45] May 13, 1975

[54] NON-COHERENT MULTI-CHANNEL OPTICAL SPECTRUM ANALYZER

[75] Inventors: Philip J. Donald, Woodbury, N.J.; George W. Hunka, Churchville; Jack J. Rudnick, Bala Cynwyd, both of Pa.

[73] Assignee: The United States of America as represented by the Secretary of the Navy

[22] Filed: Feb. 26, 1968

[21] Appl. No.: 709,860

[52] U.S. Cl. ............................................ 324/77 K
[51] Int. Cl. .......................................... G01r 23/18
[58] Field of Search ........... 324/77 K; 340/15.5 CF, 340/15.5 RSC

[56] References Cited
UNITED STATES PATENTS
2,820,173  1/1958  Raabe .................................. 324/77
3,052,843  9/1962  Hurvitz ................................ 324/77

Primary Examiner—Maynard R. Wilbur
Assistant Examiner—G. E. Montone
Attorney, Agent, or Firm—R. S. Sciascia; Q. E. Hodges

[57] ABSTRACT

A system for simultaneously analyzing the frequency content of a plurality of complex input signals. The input signals are converted to optical signals and recorded on photographic film. Each input signal is assigned a discrete track on the continuous film. Each track appears as a density modulated series of bands across the track. The optical representation of the signal as it appears on the track is analyzed by superimposing on the track a pattern representative of the frequency band of interest. When the superimposed image corresponds to the frequency of the track, light projected through the film is modulated and is picked up by photo-detectors which transform the modulated optical signals to electrical signals for recording or viewing on a cathode-ray tube.

4 Claims, 4 Drawing Figures

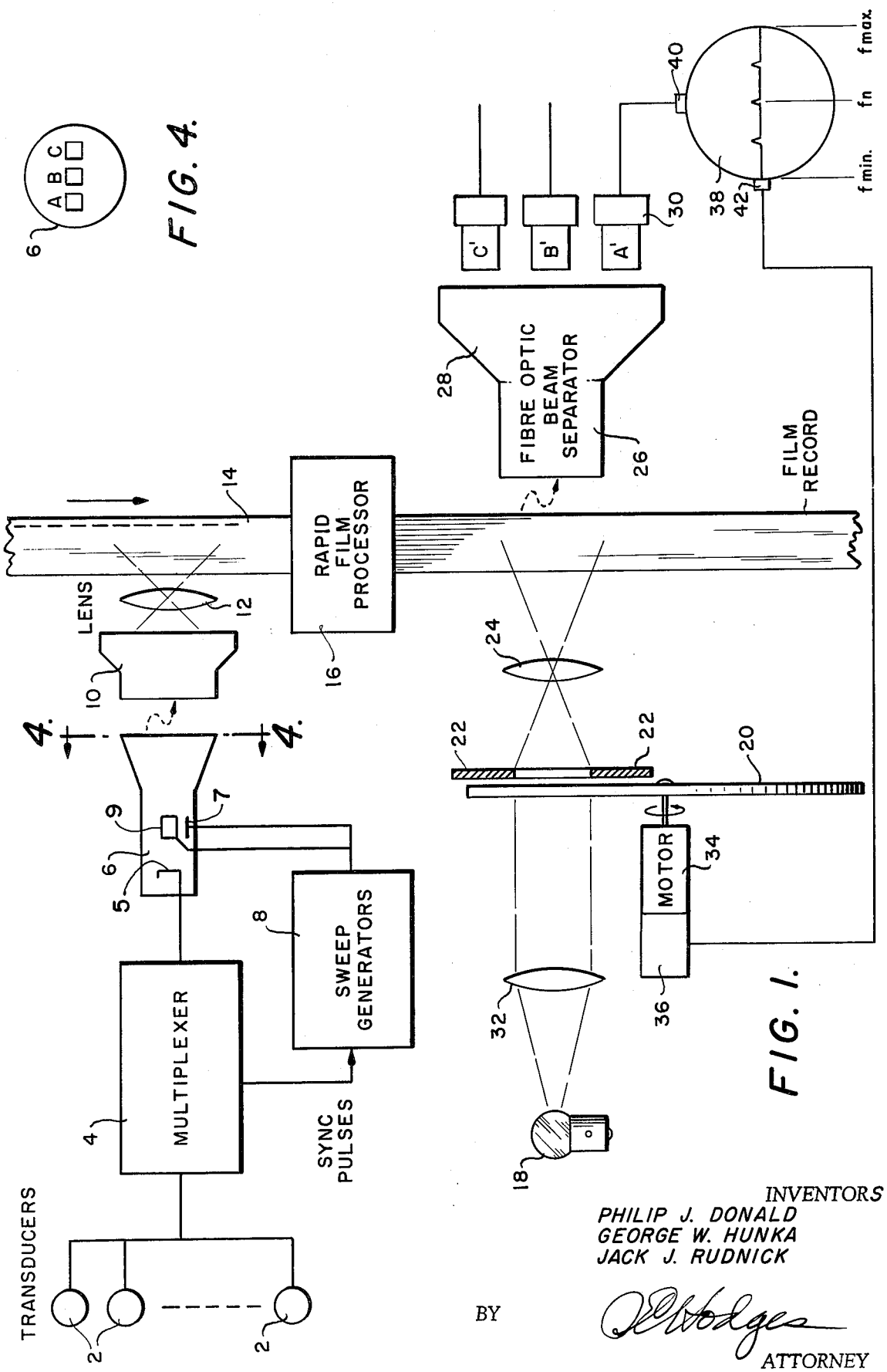

INVENTORS
PHILIP J. DONALD
GEORGE W. HUNKA
JACK J. RUDNICK

BY
*Hodges*
ATTORNEY

NON-COHERENT MULTI-CHANNEL OPTICAL SPECTRUM ANALYZER

The invention described herein may be manufactured and used by or for the Government of the United States of America for governmental purposes without the payment of any royalties thereon or therefor.

BACKGROUND OF THE INVENTION

The present invention relates to a system for simultaneously analyzing a plurality of complex electrical signals through optical-electrical means. Present systems for analysis of electrical signals generally utilize complex electronics, including a plurality of band-pass filters and amplifiers for determining the frequency content of the signals. Such systems, suitable for simultaneously analyzing several signals, are expensive to produce and maintain as well as requiring a large volume of equipment. Because of the complexity required, these systems generally exhibit a relatively low reliability. The system disclosed herein overcomes these disadvantages by converting the raw signal inputs to optical signals which can be processed by simple and reliable optical equipment. The signals are optically analyzed and reconverted to electrical signals suitable for recording to provide a permanent record for future study or for display on the tube of a cathode-ray oscilloscope.

Thus it is an object of the present invention to provide a novel system for analysis of complex electrical signals.

A further object of the invention is to provide a simple optical means for complex signal analysis.

Another object of the invention is to provide a system for simultaneous analysis of a plurality of complex electrical signals.

The foregoing and other objects, features and advantages of the invention will be apparent from the following more particular description of the preferred embodiment thereof as illustrated in the accompanying drawings.

BRIEF DESCRIPTION OF THE DRAWINGS

FIG. 1 is an electro-mechanical block diagram of an embodiment of the invention for analyzing multiinput signals;

FIG. 4 is a representation of the presentation of the signals on a cathode-ray tube.

DESCRIPTION OF THE PREFERRED EMBODIMENT

Figure 3:
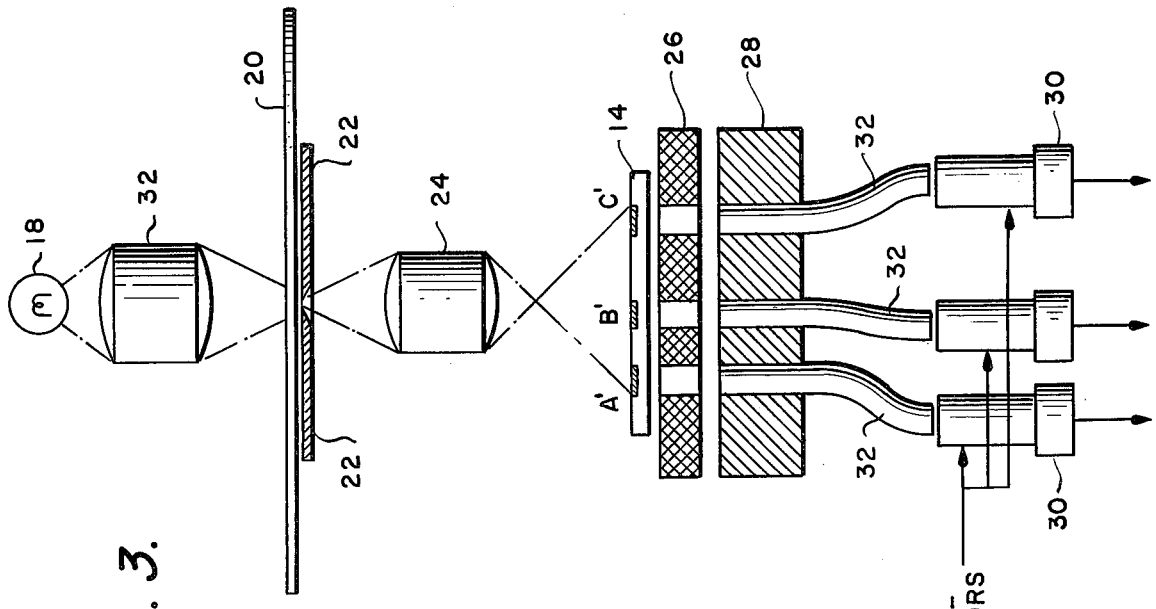
FIG. 3 is a detailed diagram of the analysis portion of the system.

Referring now to the drawings wherein like reference characters designate like or corresponding parts throughout the several views, there is shown in FIG. 1 an electro-mechanical diagram of the system. The inputs to the system, derived from a plurality of transducers 2, are fed to a time-division multiplexer 4 of any suitable well known construction. Multiplexed signals are then fed from multiplexer 4 to the beam control grid 5 of a cathode-ray tube 6. The sync pulses generated in the multiplexer are fed to conventional sweep generators 8. The synchronizing pulses control sweep and blanking circuits in the sweep generator. The output of the sweep generator 8 is then fed to the horizontal deflection plates 9 and vertical deflection plates 7 of a cathode-ray tube. The sweep and blanking signals, generated in sweep generator 8, cause each individual input signal to be displayed as a discrete area on the face of the cathode-ray tube. FIG. 4 is a representation of the face of the tube 6 showing three signals displayed on the face thereof.

Adjacent to the face of the tube there is placed a fibre optic beam separator 10. This beam separator is similar in construction to the beam separator designated 28, the details of which are described below. The beam separator transmits the optical representation of the input signals through lens 12 onto a photo-sensitive film 14. Separator 10 projects to the film each signal on a discrete track on the film. The moving film is then passed into a rapid film processor 16 where it is developed in a conventional manner. The developed film, emerging from the processor, contains three density modulated tracks representative of the three input signals. The density at any given point represents the signal amplitude and the time base is provided by the movement of the film. Thus through the conversion portion of the system, electrical inputs have been converted to optical signals containing amplitude and time base information for further processing. The developed film now passes from the conversion stage through the analysis portion of the system.

The analysis portion of the system employs a noncoherent light source 18, a condenser lens 32, a reference frequency mask 20, a slit plate 22, and an imaging lens system 24 aligned with the film record 14.

Figure 2:
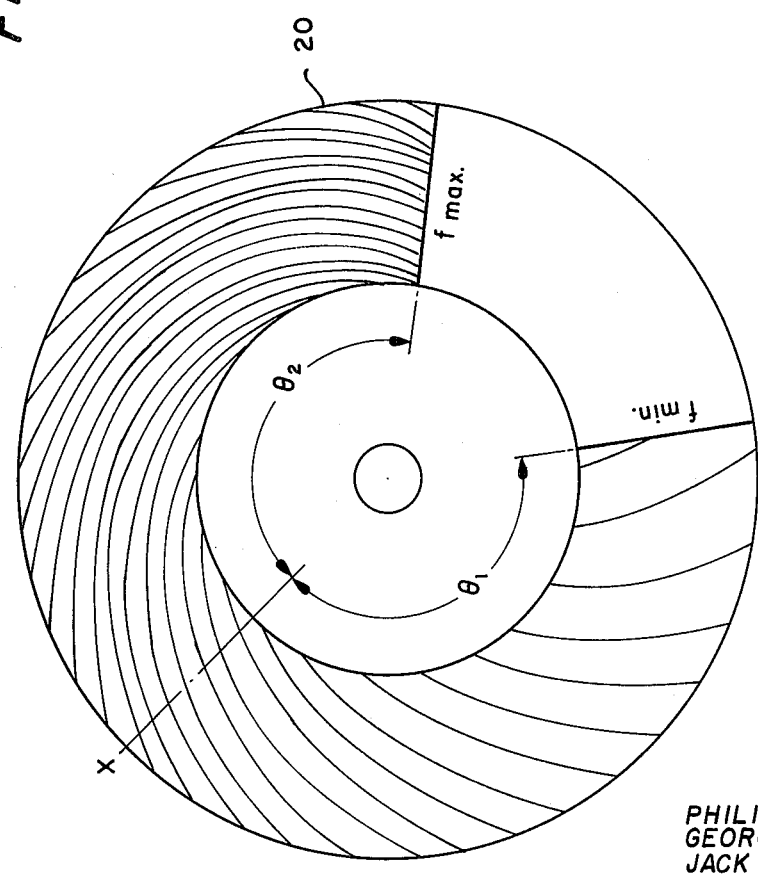
FIG. 2 is a representation of the optical pattern of the reference frequency mask.

Referring now to FIG. 2, there is shown a detailed drawing of the reference frequency mask 20. The reference frequency mask is of a transparent material upon which an opaque pattern has been reproduced photographically or in any other suitable manner. The pattern consists of a plurality of arcuate lines constructed such that a radial line extending from the center of the disk intersects a number of arcuate lines directly proportional to the angular displacement of the radial line from a given reference point. The number and spacing of the arcuate lines will be dependent upon the expected frequency band contained in the input signals to the system. To further illustrate the characteristics of the reference frequency pattern, a radial line, as illustrated by line X in FIG. 2 in which $\theta_1$ is equal to $\theta_2$, would be representative of a frequency midway between the maximum and minimum frequencies of interest.

The operation of the analysis portion of the system is as follows:

Noncoherent light from the source 18 is directed through the condensing lens system 32. The light from this lens is then projected onto the reference frequency mask 20. The reference frequency mask is rotated by means of motor 34 at a preselected angular speed. Immediately adjacent the reference frequency mask and on the side opposite from the light source there is placed a slit plate 22. This plate is of an opaque material having a slit-like opening through the plate. The plate is arranged in relation to the reference frequency mask so that the slit opening is along (i.e. superimposable upon) a radial line of the mask. Light passing through the reference frequency mask and the slit is collected in lens system 24. This lens system is so arranged that the light passing through the lens 24 is spread across the entire width of film strip 14. The light projecting on the film is density modulated by the pattern of the rotating frequency mask. Thus for each revolution of the mask a series of patterns representative of the frequency band from a minimum frequency, F min, to a maximum frequency, F max, is projected across the film strip. When the instantaneous pattern projected on the film corresponds to the pattern of one of the film tracks, light passing through the film is modulated in intensity. The modulated light signals are then picked up in a fibre optic beam separator 28. The beam separator 28 consists of fibre optics 32 which separate the signals and conduct the modulated signals to photo-detectors 30. The photo-detectors then convert the modulated optical signal to a modulated electrical signal. The modulated outputs of the photo-detectors 30, when synchronized with the rotation of the reference frequency mask, are thus indicative of the frequency content of the input signal.

FIG. 1 illustrates one method of displaying the modulated signals for analysis. There is attached to the reference frequency mask, a drive motor 34, and a signal generator 36. The output of the signal generator is proportional to the rotational position of the mask with respect to the slit plate 22. The output of the signal generator is connected to the horizontal deflection plates at 42. The output of each photo-detector is connected to the vertical deflection plates as shown at 40. Thus, for each revolution of the frequency mask a horizontal line is generated across the face of the tube, the ends of the line representing minimum and maximum frequencies. As the light impinging on the photo-detector is modulated, as described above, the input to the vertical deflection plate will cause a vertical deviation in the horizontal line. Thus, the representation on the face of cathode-ray tube 38 in FIG. 1 indicates that the signal A' is of a frequency designated $F_n$ which is approximately midway between the minimum and maximum frequencies contained in the reference frequency mask. As is obvious from the foregoing description, if the output signal contains more than one frequency, these will appear as additional deviations or pips on the horizontal line. Each of the other signals, B' and C', may be displayed in the same manner.

The display technique thus described is applicable to various other devices having the capability of accepting two axis information. For example, an X–Y recorder provides the desired capability as does a recording oscillograph. Where simultaneous analysis of a large number of signals is desired a multi-channel recording oscillograph may be employed.

Thus, from the above description, it can be seen that there is provided herein a novel method for simultaneous analysis of a plurality of electrical signals by relatively simple optical equipment having a high degree of accuracy and reliability.

Obviously many modifications and variations of the present invention are possible in the light of the above teachings. For example, it is appreciated that while the embodiment described herein is directed to a multi-channel system, the invention may be employed for analysis of a single input signal. It is, therefore, to be understood that within the scope of the appended claims the invention may be practiced otherwise than as specifically described.

What is claimed is:

1. Apparatus for analyzing the frequency content of an electrical input signal comprising:

electronic display means connected to said input signal for converting said input signal into an intensity modulated optical signal;

means for projecting said optical signal;

movable photo-sensitive recording means for recording said projected optical signals at a preselected speed for providing a time base for said recording;

means for generating a plurality of optical reference signals, each of said optical reference signals being representative of a different particular frequency within a preselected frequency band;

means for comparing the frequency of said optical signal with said reference signals;

means responsive to said comparison means for detecting coincidence of frequency of said optical signal with the frequency of any of said reference signals; and means for determining the frequency of the reference signals coinciding with said optical signals.

2. Apparatus for analyzing the frequency content of an electrical signal comprising:

means for converting the electrical input signal to an optical signal having the same frequency content as said input signal;

a light source;

a circular transparent reference frequency mask having an opaque pattern on the surface thereof representative of a preselected frequency band;

a plate having a slit-like opening and mounted adjacent said mask on the opposite side from said light source and arranged such that said opening lies along a radial line with respect to said mask;

means for rotating said mask at a predetermined rate;

means for determining the instantaneous angular position of said mask with respect to said opening;

means for projecting light from said source through said mask and said opening whereby the light projected through said slit is modulated by said rotating pattern and is projected as a series of lines extending across said opening and varying from a minimum to a maximum number of lines representative of the preselected frequency band;

means for comparing the frequency of said optical signal with said reference signals;

means responsive to said comparison means for detecting coincidence of frequency of said optical signal with the frequency of any of said reference signals; and means for determining the frequency of the reference signals coinciding with said optical signals.

3. Apparatus for simultaneously analyzing the frequency content of a plurality of electrical signals comprising:

electronic display means connected to said electrical signals for optically displaying said electrical signals;

means connected to said electrical signals and said display means for causing said electrical signals to appear on said display means as unique optical signals density modulated according to the frequency of said electrical signals;

means for projecting said optical signals to a continuously moving, photo-sensitive film such that each of said optical signals appears on said film as a separate density modulated track;

means for generating a plurality of optical reference signals, each of said signals being of a different frequency within a preselected frequency band;

means for simultaneously comparing each of said optical signals with said optical reference signals;

means for determining coincidence of frequency between said optical signals and said optical reference signals and generating an electrical output in response thereto; and means for determining the frequency of the optical signals coinciding with frequencies of said optical signals.

4. Apparatus for simultaneously analyzing the frequency content of a plurality of electrical signals comprising:

a means for converting said electrical signals to optical signals having the same frequency content as said electrical signals;

a light source;

a circular transparent reference frequency mask having an opaque pattern on the surface thereof representative of a preselected frequency band;

a plate having a slit-like opening and mounted adjacent said mask on the opposite side from said light source and arranged such that said opening lies along a radial line with respect to said mask;

means for rotating said mask at a predetermined rate;

means for determining the instantaneous angular position of said mask with respect to said opening;

means for projecting light from said source through said mask and said opening whereby the light projected through said slit is modulated by said rotating pattern and is projected as a series of lines extending across said opening and varying from a minimum to a maximum number of lines representative of the preselected frequency band;

means for simultaneously comparing each of said optical signals with said optical reference signals;

means for determining coincidence of frequency between said optical signals and said optical reference signals and generating an electrical output in response thereto; and means for determining the frequency of the optical signals coinciding with frequencies of said optical signals.

* * * * *